United States Patent [19]

Kinoshita et al.

[11] Patent Number: 5,465,475
[45] Date of Patent: Nov. 14, 1995

[54] METHOD OF FORMING A THIN FILM MAGNETIC HEAD

[75] Inventors: Mikio Kinoshita, Kawasaki; Wasaburo Ohta, Yokohama, both of Japan

[73] Assignee: Ricoh Co., Ltd., Tokyo, Japan

[21] Appl. No.: 99,103

[22] Filed: Jul. 29, 1993

[30] Foreign Application Priority Data

Jul. 30, 1992  [JP]  Japan .................................. 4-203731
Mar. 12, 1993  [JP]  Japan .................................. 5-052600

[51] Int. Cl.⁶ ........................................ G11B 5/42
[52] U.S. Cl. ............................... 29/603; 360/123
[58] Field of Search ........................ 29/603; 360/123, 360/125–127

[56] References Cited

U.S. PATENT DOCUMENTS 3,839,784  10/1974  Pierce .................................. 29/603

FOREIGN PATENT DOCUMENTS 317808  1/1991  Japan .................................. G11B 5/31
330105  2/1991  Japan .................................. G11B 5/31

*Primary Examiner*—Carl E. Hall
*Attorney, Agent, or Firm*—Cooper & Dunham

[57] ABSTRACT

A thin film magnetic head has a lower magnetic pole formed on a substrate; a coil arranged on the lower magnetic pole through an adhesive layer; an upper magnetic pole arranged on the coil; and a gap layer formed between the upper and lower magnetic poles. A method for forming the thin film magnetic head has a process for forming a lower magnetic pole on a first substrate; a process for forming a coil on a second substrate having a recessed portion; a process for polishing the first and/or second substrate such that a face of the lower magnetic pole on the first substrate and a face of the coil on the second substrate come in close contact with each other; a process for adhering the first and second substrates to each other such that the lower magnetic pole and the coil are adjacent to each other; a process for forming a gap layer on the lower magnetic pole; a process for polishing or etching a portion or all of the second substrate; and a process for forming an upper magnetic pole. In this magnetic head and the forming method, high performance can be obtained and cost of the thin film magnetic head can be reduced.

18 Claims, 9 Drawing Sheets

METHOD OF FORMING A THIN FILM MAGNETIC HEAD

BACKGROUND OF THE INVENTION

1. Field of the Invention

The present invention relates to a thin film magnetic head and a method for forming the thin film magnetic head.

2. Description of the Related Art

In a general proposed thin film magnetic head, a lower magnetic pole, a gap layer, a coil having an insulating layer and an upper magnetic pole are formed on a substrate. In this thin film magnetic head, a lower protecting layer is formed on the substrate made of alumina-titanium carbide. Thereafter, the lower magnetic pole made of permalloy, etc., the gap layer, the spiral coil having the insulating layer and the upper magnetic pole are sequentially formed on the protecting layer.

In such a thin film magnetic head, the density of a magnetic record is increased to certain extent, but there are problems about reduction in cost and high performance. In particular, high performance is required with respect to the spiral coil. However, since it is difficult to form a multiple layer film, it is difficult to cheaply manufacture a spiral coil having high performance and form an upper magnetic pole which is not easily deteriorated. Further, there is a limit of the material of a magnetic layer since it is necessary to restrain the lower magnetic pole from being deteriorated by damage thereof at a fine processing time of the coil. A high recording density can be obtained by using a high magnetic permeability layer having a high saturation magnetic flux density. However, when a thin film made of iron nitride and iron as one material of the high magnetic permeability layer is formed, magnetic characteristics of the thin film are reduced by oxidation thereof.

The above thin film magnetic head has problems about reduction in cost, a high magnetic recording density and high performance corresponding to a high frequency. In particular, it is necessary to narrow a track and a gap of a recording medium and lengthen this gap so as to improve the recording density. Therefore, it is necessary to increase a winding number of the coil and use a high saturation magnetized magnetic layer, etc. However, it is difficult to cheaply manufacture a coil having a high winding number since it is difficult to form a multiple layer film.

There are also problems about deterioration of the upper magnetic pole caused by irregularities on a face of the spiral coil having the insulating layer on which the upper magnetic pole is formed. In particular, when multiple layer wirings of the coil are excessively formed, it is difficult to remove a difference in step and stress on the coil face on which the upper magnetic pole is formed. Therefore, it is difficult to form an upper magnetic pole having preferable magnetic characteristics as soft magnetism so that it is difficult to obtain a preferable S/N ratio in a high frequency operation of the magnetic head.

A magnetic pole is deteriorated by damage thereof in fine processing of the coil. When the magnetic record is made at a high density, a high Bs magnetic material as a high saturation magnetic flux density material is desirably used as the magnetic pole. However, it is difficult to apply this magnetic material to the magnetic head since $\alpha^{11}Fe_{16}N_2$, etc. constituting the magnetic material have great coercive force.

SUMMARY OF THE INVENTION

It is therefore a first object of the present invention to provide a thin film magnetic head and a forming method thereof in which thin film layers deposited on two kinds of substrates are adhered to each other without sequentially depositing thin film layers constituting the magnetic head on a single substrate as in the general case so that high performance of the thin film magnetic head is obtained and cost thereof is reduced.

A second object of the present invention is to provide a method for forming a thin film magnetic head in which it is possible to restrain the magnetic characteristics of a magnetic layer from being reduced by oxidation thereof caused when a thin film made of iron or iron nitride is used as the magnetic layer.

A third object of the present invention is to provide a thin film magnetic head and a forming method thereof in which a magnetic head can be made at a high density and it is possible to cope with a high frequency operation of the magnetic head.

In accordance with a first structure of a first construction of the present invention, the first object can be achieved by a thin film magnetic head comprising a lower magnetic pole formed on a substrate; a coil arranged on the lower magnetic pole through an adhesive layer; an upper magnetic pole arranged on the coil; and a gap layer formed between the upper and lower magnetic poles.

In accordance with a fourth structure of the present invention, a method for this thin film magnetic head comprises the steps of forming a lower magnetic pole on a first substrate; forming a coil on a second substrate having a recessed portion; polishing the first and/or second substrate such that a face of the lower magnetic pole on the first substrate and a face of the coil on the second substrate come in close contact with each other; for adhering the first and second substrates to each other such that the lower magnetic pole and the coil are adjacent to each other; forming a gap layer on the lower magnetic pole; polishing or etching a portion or all of the second substrate; and forming an upper magnetic pole.

In accordance with an eighth structure of the present invention, a method for forming the thin film magnetic head may comprise the steps of forming a lower magnetic pole on a first substrate; forming a coil on a second substrate having a recessed portion; polishing the first and/or second substrate such that a face of the lower magnetic pole on the first substrate and a face of the coil on the second substrate come in close contact with each other; adhering the first and second substrates to each other such that the lower magnetic pole and the coil are adjacent to each other; forming a gap layer on the lower magnetic pole; polishing or etching a portion or all of the second substrate; forming a coil on the polished or etched second substrate; and forming an upper magnetic pole.

In accordance with a ninth structure of a second construction of the present invention, the above first object can be also achieved by a thin film magnetic head comprising a lower magnetic pole formed on a substrate; a coil arranged on the lower magnetic pole through an adhesive layer; an upper magnetic pole arranged on the coil; and a gap layer formed between the upper and lower magnetic poles. The substrate has a recessed portion configured for the shape of the coil.

In accordance with an eleventh structure of the present invention, a method for forming this thin film magnetic head comprises the steps of forming a lower magnetic pole on a first substrate having a recessed portion; forming a coil on a second substrate; adhering the first and second substrates to each other such that the lower magnetic pole and the coil are adjacent to each other; forming a gap layer on the lower magnetic pole; polishing or etching a portion or all of the second substrate; and forming an upper magnetic pole.

In accordance with a fifteenth structure of the present invention, a method for forming the thin film magnetic head may comprise the steps of forming a lower magnetic pole on a first substrate having a recessed portion; forming a coil on a second substrate; a process for adhering the first and second substrates to each other such that the lower magnetic pole and the coil are adjacent to each other; forming a gap layer on the lower magnetic pole; polishing or etching a portion or all of the second substrate; forming a coil on the polished or etched second substrate; and forming an upper magnetic pole.

In accordance with a thirteenth structure of the present invention, to achieve the above second object, the lower magnetic pole is made of iron or iron nitride and is annealed before the lower magnetic pole is exposed to an atmosphere including oxygen after the lower magnetic pole is formed. In accordance with a fourteenth structure of the present invention, to achieve the above second object, the upper magnetic pole is made of iron or iron nitride and is annealed before the upper magnetic pole is exposed to an atmosphere including oxygen after the upper magnetic pole is formed.

As mentioned above, the thin film magnetic head of the present invention has an adhesive layer for adhering thin film layers formed on the two substrates so that the thin film magnetic head is integrally formed.

The first construction of the thin film magnetic head of the present invention and the forming method thereof will first be described in detail.

A lower magnetic pole and a gap layer are first formed on a first substrate. A coil is formed such that the coil is fitted in to a recessed portion of a second substrate. At this time, an insulating layer is additionally formed when a metallic magnetic film, etc. is used as a magnetic layer and a multiple layer coil is formed. The first and second substrates are adhered to each other through the adhesive layer such that the lower magnetic pole and the coil are adjacent to each other. Accordingly, in the present invention, fine processing of the thin film magnetic head in the formation of the coil can be performed in a state in which there is no lower magnetic pole. Accordingly, it is not necessary to take measures for preventing the lower magnetic pole from being deteriorated at a fine processing time. After the first and second substrates are adhered to each other, the second substrate is polished or etched except for a coil portion thereof. An additional coil may be arbitrarily formed on the etched second substrate. In this case, the additional coil is electrically connected through a contact hole to the coil formed in the recessed portion of the second substrate in accordance with necessity. Finally, the upper magnetic pole is formed on an exposed portion of each of the gap layer and layers of the coil and the lower magnetic pole, thereby constructing the thin film magnetic head.

When the second substrate is crystalline, it is effective to form the recessed portion of this second substrate by anisotropic etching. It is possible to restrain the magnetic characteristics of the upper magnetic pole from being reduced if a difference in step on a substrate face for forming the upper magnetic pole is reduced by the anisotropic etching. Further, if a buffer layer for adhesion is disposed in an adhering portion between the first substrate and the second substrate, it is possible to restrain a magnetic layer from being deteriorated by adhesive stress. When the magnetic layer is made of iron nitride, a gap layer is preferably adhered to the magnetic layer if the gap layer is made of iron nitride having a $\zeta$ structure.

The second construction of the thin film magnetic head and the forming method thereof relate to ninth to twelfth and fifteenth structures of the present invention. In this second construction, a first substrate is constructed by a structure having a recessed portion fit for the shape of a coil. Operations and effects of the other constructional portions are similar to those in the first construction and the forming method thereof.

In a third construction of the present invention, a recording density is improved if the magnetic layer is formed by iron or iron nitride as a high saturation magnetic flux density material. Magnetic characteristics of this magnetic layer made of iron or iron nitride are reduced by oxidation thereof. This oxidation is mainly caused after leak. In the present invention, this oxidation after leak can be greatly restrained by annealing the lower or upper magnetic pole before the lower or upper magnetic pole is exposed to an atmosphere including oxygen, thereby forming a preferable thin film magnetic head.

The above third object can be achieved by the above-mentioned first structure of the present invention.

In accordance with a third structure of the present invention, the coil in the first structure is constructed by multiple layers and a filling layer for improving flatness of the multiple layers is formed between the multiple layers.

In accordance with a sixteenth structure of the present invention, a method for forming a thin film magnetic head comprises the steps of a process for forming a lower magnetic pole on a first plane substrate; a process for adhering the lower magnetic pole and the coil to each other; a process for forming an upper magnetic pole on the coil; and a process for forming a gap layer between the lower and upper magnetic poles.

In accordance with a seventeenth structure of the present invention, the process for forming the lower magnetic pole on the first plane substrate in the sixteenth structure is set to a process for forming the lower magnetic pole on the first plane substrate having a recessed portion fit for a shape of the coil and forming a filling layer on a recessed portion of the lower magnetic pole, and the coil is adhered onto this filling layer.

In accordance with an eighteenth structure of the present invention, the forming method in the sixteenth or seventeenth structure further comprises the steps of a process for forming a separating layer and a first coil on the first plane substrate; a process for adhering the first coil onto a second plane substrate; a process for separating the first plane substrate and the first coil from each other with the separating layer as a boundary; and a process for integrally forming a second coil on the first coil; this second coil being adhered to the lower magnetic pole.

In accordance with a nineteenth structure of the present invention, a constructional member in the sixteenth or seventeenth structure has a layer coil having single or plural layers; a second substrate; and a separating layer formed in at least one of two spaces composed of a space between the first plane substrate and the layer coil and a space between the layer coil and the second plane substrate; this constructional member is formed on the first plane substrate and is separated from the first plane substrate with the separating layer as a boundary; and another coil is integrally formed on an exposure surface of the layer coil.

In accordance with a twentieth structure of the present invention, the forming method in the nineteenth structure further comprises a process for forming a filling layer between the separating layer and the layer coil.

In accordance with a twenty-first structure of the present invention, the forming method in the nineteenth structure further comprises a process for adhering a third plane substrate onto the integrally formed another coil through another separating layer.

In accordance with a twenty-second structure of the present invention, the forming method in the twenty-first structure further comprises a process for forming a filling layer between the another separating layer and the another coil to improve flatness thereof.

In accordance with a twenty-third structure of the present invention, one or plural grooves are formed on a plane of each of the plane substrates in the eighteenth structure.

In the above first structure of the present invention, the coil is used to record, reproduce and erase a signal from a recording medium through the lower magnetic pole, the upper magnetic pole and the gap layer.

In the third structure of the present invention, flatness of the coil layers is improved by the filling layer formed between the coil layers in the first structure.

In the sixteenth to twenty-third structures of the present invention, the density of a magnetic record can be increased and it is possible to cope with a high frequency operation.

Further objects and advantages of the present invention will be apparent from the following description of the preferred embodiments of the present invention as illustrated in the accompanying drawings.

DESCRIPTION OF THE PREFERRED EMBODIMENTS.

The preferred embodiments of a thin film magnetic head and a forming method thereof in the present invention will next be described in detail with reference to the accompanying drawings.

Figure 1:
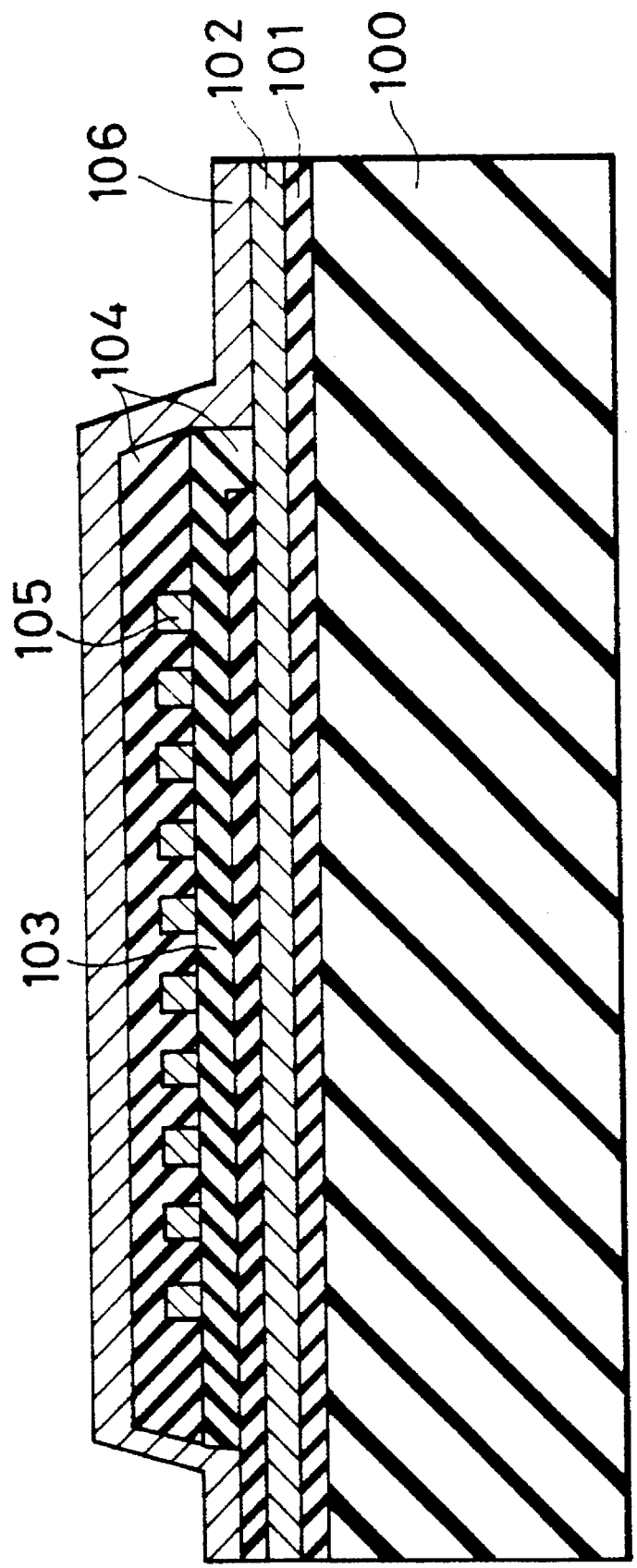
FIG. 1 is a cross-sectional view showing one example of a general thin film magnetic head.

FIG. 1 shows one example of a general thin film magnetic head. In this thin film magnetic head, a lower protecting layer 101 is formed on a substrate 100 made of alumina-titanium carbide. Thereafter, a lower magnetic pole 102 made of permalloy, etc., a gap layer 103, a spiral coil 105 having an insulating layer 104, and an upper magnetic pole 106 are sequentially formed on the protecting layer 101.

In such a thin film magnetic head, the density of a magnetic record is increased to a certain extent, but there are problems about reduction in cost and high performance. In particular, high performance is required with respect to the spiral coil. However, since it is difficult to form a multiple layer film, it is difficult to cheaply manufacture a spiral coil having high performance and form an upper magnetic pole which is not easily deteriorated. Further, there is a limit of the material of a magnetic layer since it is necessary to restrain the lower magnetic pole from being deteriorated by damage thereof at a fine processing time of the coil. A high recording density can be obtained by using a high magnetic permeability layer having a high saturation magnetic flux density. However, when a thin film made of iron nitride and iron as one material of the high magnetic permeability layer is formed, magnetic characteristics of the thin film are reduced by oxidation thereof.

The above thin film magnetic head has problems about reduction in cost, a high magnetic recording density and high performance corresponding to a high frequency. In particular, it is necessary to narrow a track and a gap of a recording medium and lengthen this gap so as to improve the recording density. Therefore, it is necessary to increase a winding number of the coil 105 and use a high saturation magnetized magnetic layer, etc. However, it is difficult to cheaply manufacture a coil having a high winding number since it is difficult to form a multiple layer film.

There are also problems about deterioration of the upper magnetic pole 106 caused by irregularities on a face of the spiral coil 105 having the insulating layer 104 on which the upper magnetic pole 106 is formed. In particular, when multiple layer wirings of the coil 105 are excessively formed, it is difficult to remove a difference in step and stress on the face of the coil 105 on which the upper magnetic pole 106 is formed. Therefore, it is difficult to form an upper magnetic pole having preferable magnetic characteristics as soft magnetism so that it is difficult to obtain a preferable S/N ratio in a high frequency operation of the magnetic head.

A magnetic pole is deteriorated by damage thereof in fine processing of the coil. When the magnetic record is made at a high density, a high Bs magnetic material as a high saturation magnetic flux density material is desirably used as the magnetic pole. However, it is difficult to apply this magnetic material to the magnetic head since $\alpha^{11}Fe_{16}N_2$, etc. constituting the magnetic material have great coercive force.

Figure 2:
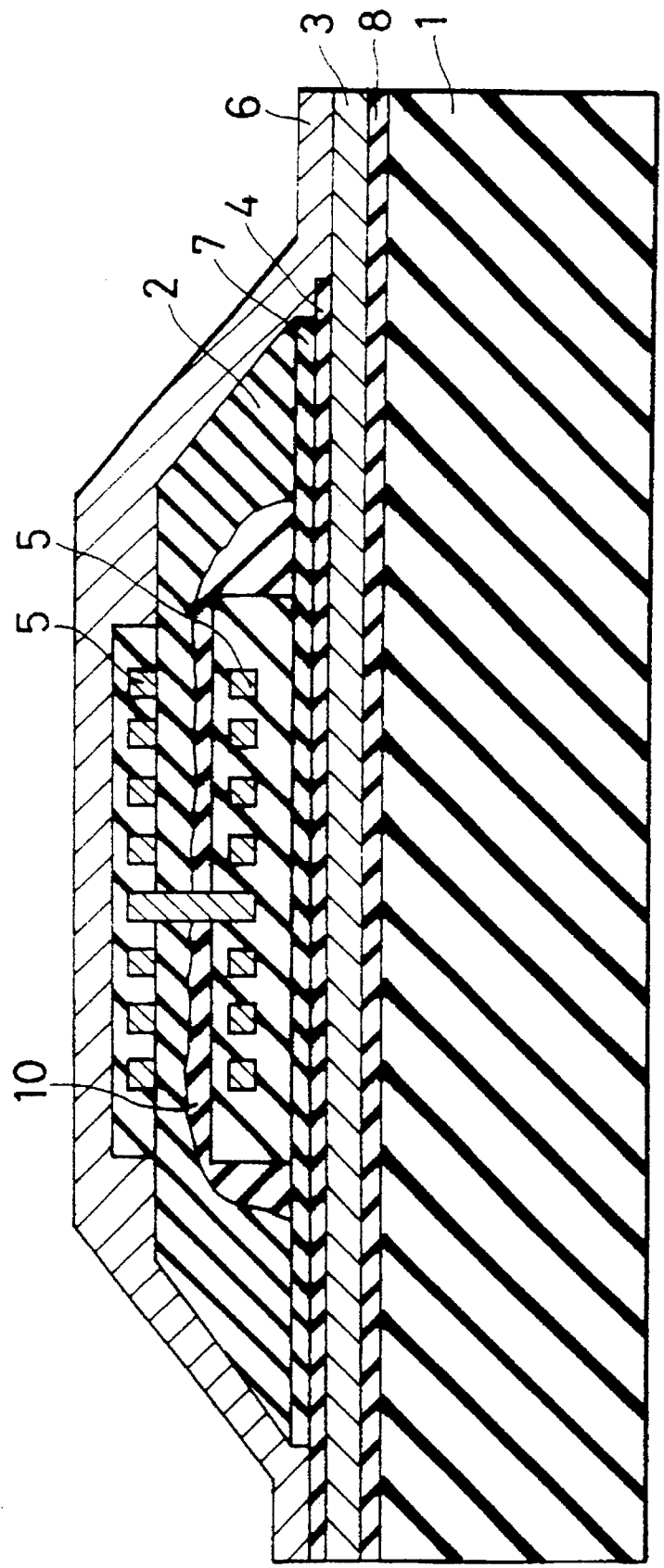
FIG. 2 is a cross-sectional view showing a thin film magnetic head in accordance with a first embodiment of the present invention.

FIG. 2 is a cross-sectional view showing a thin film magnetic head in accordance with a first embodiment of the present invention. This thin film magnetic head has a lower magnetic pole 3, a coil 5, an upper magnetic pole 6 and a gap layer 4. The lower magnetic pole 3 is formed on a first substrate 1 coated with a protecting layer 8. The coil 5 is formed on the lower magnetic pole 3 through an adhesive layer 7. The upper magnetic pole 6 is arranged on an upper portion of the coil 5. The gap layer 4 is formed between the upper magnetic pole 6 and the lower magnetic pole 3.

FIGS. 4a to 4d are schematic views showing a process for forming the thin film magnetic head shown in FIG. 2. The forming process of the thin film magnetic head will next be described with reference to FIGS. 4a to 4d.

In FIGS. 4a to 4d, a material of the first substrate 1 is selected from alumina, alumina-titanium carbide, glass, sintered forsterite, etc. in accordance with magnetic characteristics of a magnetic layer. In this first embodiment, the first substrate 1 is made of alumina-titanium carbide and is coated with alumina as the protecting layer 8.

A method for forming a thin film on this first substrate 1 is constructed by a sputtering method, an evaporation method, etc. In this first embodiment, a plasma evaporation method invented by one of the inventors in this patent application is used. For example, this plasma evaporation method is shown in Japanese Patent Publication (KOKOKU) No. 2-16380.

Figure 4A:
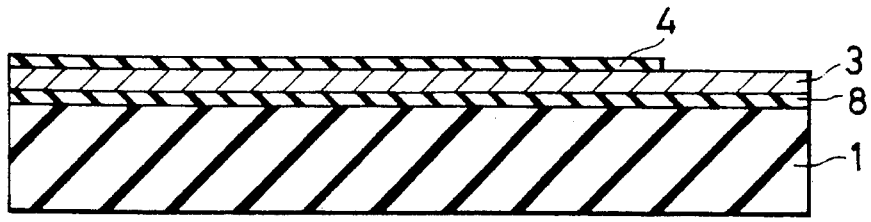
FIGS. 4a to 4d are schematic views showing a process for forming the thin film magnetic shown in FIG. 2.

In the thin film forming process, permalloy, Sendust, iron, iron nitride having each of $\alpha$, $\alpha'$ and $\alpha''$ structures, iron-silicon alloy, etc. are first selected as a magnetic material. In this embodiment, iron nitride having the $\alpha$ structure is selected as the magnetic material to form a magnetic thin film. As shown in FIG. 4a, this thin film is formed as a lower magnetic pole 3 on the protecting layer 8 of the substrate 1. A gap layer 4 is formed on this lower magnetic pole 3. This gap layer 4 is made of silicon dioxide, alumina, etc. The gap layer 4 may be made of iron nitride having a $\zeta$ structure. The $\zeta$ structure is formed by a magnetic material having a high saturation magnetic flux density and made of iron, Fe—Co alloy, etc.

Figure 4B:
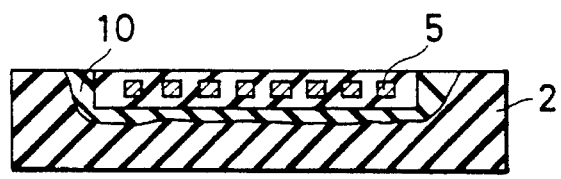

As shown in FIG. 4b, a second substrate 2 having a recessed portion 10 is prepared. A material of this second substrate 2 is constructed by glass, monocrystal silicon, monocrystal rock salt, etc. and is coated with a protecting layer made of alumina, silicon dioxide, etc. in accordance with necessity. In this embodiment, the second substrate 2 is selectively made of monocrystal silicon. The recessed portion 10 of the second substrate 2 is formed by etching using a resist, a solution of potassium hydroxide, etc. This recessed portion 10 is filled with glass, epoxy resin, etc. The recessed portion 10 has a flat bottom portion formed by a die. A spiral coil 5 made of copper is formed on this recessed portion 10. This spiral coil 5 is formed by a known fine processing technique using a photoresist. The recessed portion 10 on the spiral coil 5 is filled with glass, epoxy resin, etc.

Figure 4C:
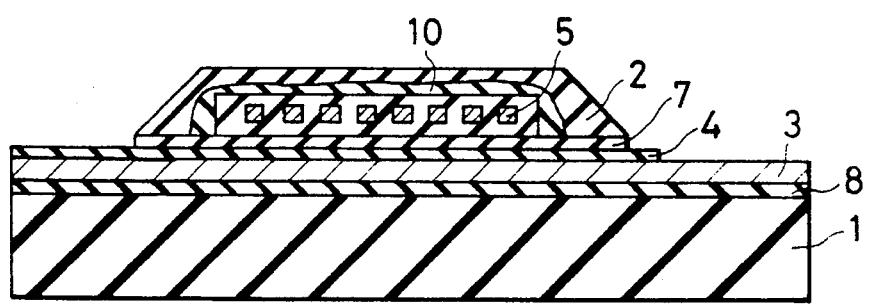

As shown in FIG. 4c, the first substrate 1 and the second substrate 2 are polished such that these substrates come in close contact with each other. The lower magnetic pole 3 and the spiral coil 5 are adhered to each other through an adhesive layer 7 such that the lower magnetic pole 3 and the spiral coil 5 are adjacent to each other. The second substrate 2 is polished until the second substrate 2 has a predetermined thickness. In this case, it is desirable to reduce a difference in step of an end portion of the second substrate 2 by anisotropic etching using potassium hydroxide, etc. Otherwise, the second substrate 2 may be selectively constructed by rock salt having a recessed portion coated with alumina having a thin thickness. In this case, a coil is formed by a dry process on this second substrate 2. If this second substrate 2 is adhered to the first substrate 1, the rock salt is removed by etching using water so that the step difference is formed by alumina and adhesive layers having a thin thickness. If an upper magnetic pole 6 is formed on a face removing this step difference therefrom, a preferable thin film magnetic head is formed.

Figure 4D:
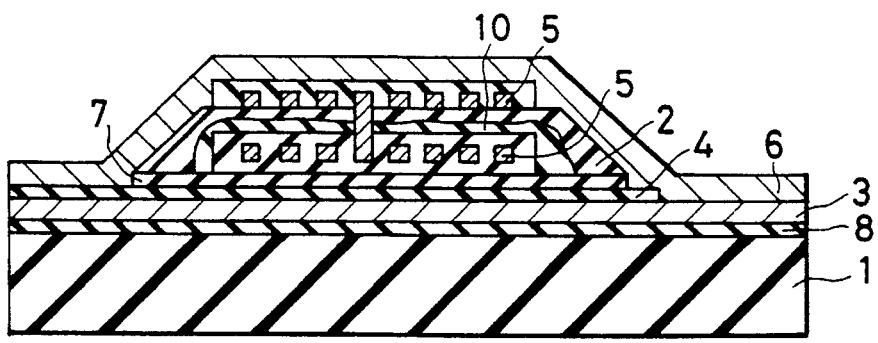

In FIGS. 2 and 4d, the additional coil 5 is formed on a surface of the second substrate 2 before the upper magnetic pole 6 is formed. In this case, the additional coil 15 is electrically connected to a coil formed in the recessed portion of the second substrate 2 through a contact hole in accordance with necessity. Magnetic characteristics of the magnetic head can be improved by forming such an additional coil 5.

Figure 3:
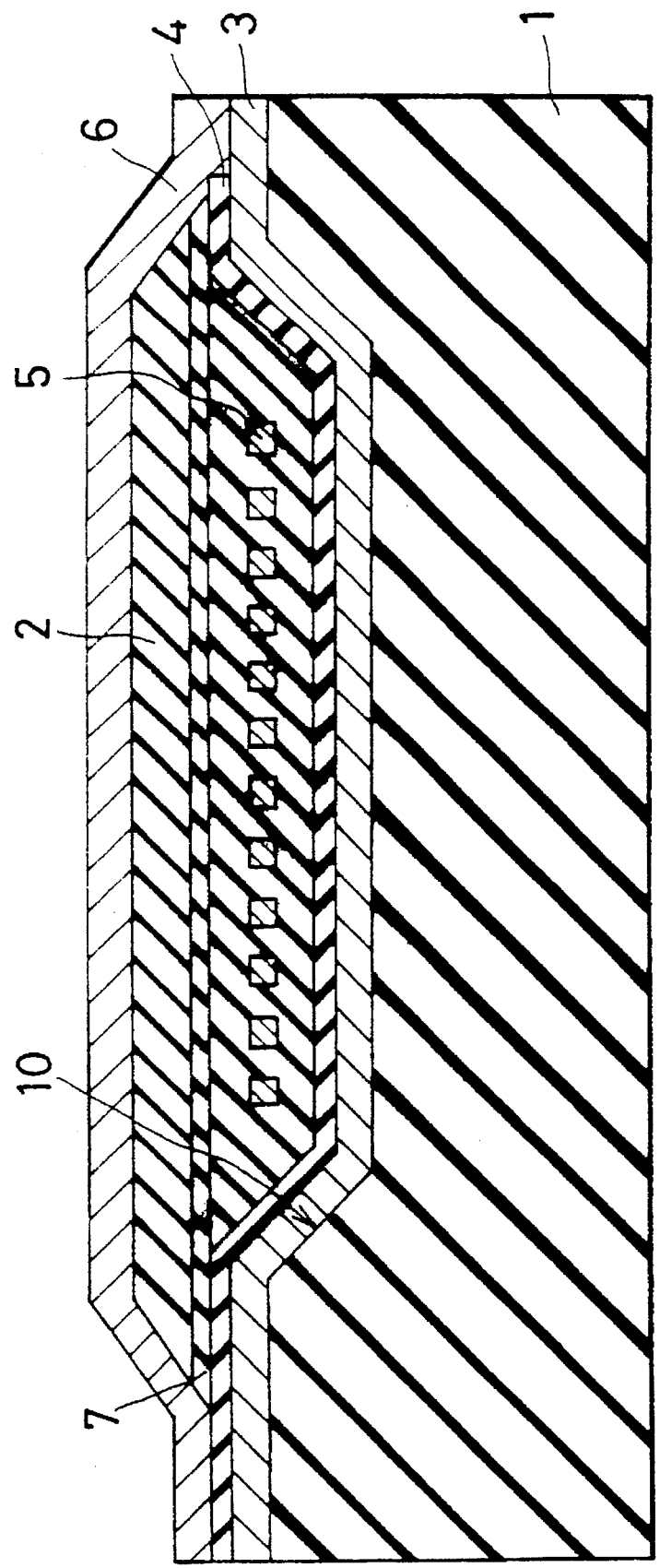
FIG. 3 is a cross-sectional view showing a thin film magnetic head in accordance with a second embodiment of the present invention.

FIG. 3 is a cross-sectional view showing a thin film magnetic head in accordance with a second embodiment of the present invention. In this thin film magnetic head, a lower magnetic pole 3 is formed on a first substrate 1 having a recessed portion 10. A coil 5 suitably fitted into this recessed portion 10 is formed on a second substrate 2. The other constructions and a method for forming this thin film magnetic head are similar to those in the first embodiment.

In the thin film magnetic head shown in each of FIGS. 2 and 3, there is a case in which a thin film made of each of iron and iron nitride and constituting a high saturation magnetic flux density layer is formed as each of the lower magnetic pole 3 and the upper magnetic pole 6 to improve a recording density. In this case, after the thin film is formed, the thin film is annealed before being exposed to an atmosphere including oxygen as a method for restraining magnetic characteristics of the thin film from being reduced by oxidation thereof. An annealing temperature is set to a temperature equal to or higher than 150° C. In particular, this annealing temperature is preferably set to a temperature equal to or higher than 300° C. The annealing temperature is preferably set to about 150° C. when iron nitride having each of a $\alpha'$ and $\alpha''$ structures is selected as the magnetic layer. Magnetization of the thin film made of iron nitride is changed in accordance with nitrogen density and structure. Magnetic permeability of the thin film can be improved if the thin film is formed by iron nitride having a higher saturation magnetic flux density in a film portion near the gap layer 4 and is formed by iron nitride having a lower saturation magnetic flux density in a film portion far from the gap layer.

As mentioned above, the first construction of a thin film magnetic head and a forming method thereof in the present invention relate to first to eighth structures. In the first construction, a first substrate 1 having a lower magnetic pole and a second substrate 2 having a coil are integrally adhered to each other through an adhesive layer such that the lower magnetic pole and the coil are adjacent to each other. Accordingly, fine processing in formation of the coil can be performed in a state in which there is no lower magnetic pole. Further, it is not necessary to take measures for deteriorating the tower magnetic pole at a fine processing time of the coil. Therefore, high performance of the thin film magnetic head can be obtained and cost thereof can be reduced.

After the second substrate 2 is etched, an additional coil is formed on the second substrate 2. Thereafter, when an upper magnetic pole is formed, magnetic characteristics of the upper magnetic pole are improved.

When the second substrate is crystalline, it is effective to form a recessed portion of this second substrate 2 by anisotropic etching. It is possible to restrain the magnetic characteristics of the upper magnetic pole from being reduced if a difference in step on a substrate face for forming the upper magnetic pole is reduced by the anisotropic etching.

Further, if a buffer layer for adhesion is disposed in an adhering portion between the first substrate 1 and the second substrate 2, it is possible to restrain a magnetic layer from being deteriorated by adhesive stress.

When the magnetic layer is made of iron nitride, a gap layer is preferably adhered to the magnetic layer if the gap layer is made of iron nitride having a $\zeta$ structure.

The second construction of a thin film magnetic head and a forming method thereof relate to ninth to twelfth and fifteenth structures of the present invention. In this second construction, a first substrate 1 is constructed by a structure having a recessed portion fit for the shape of a coil. Operations and effects of the other constructional portions are similar to those in the first construction and the forming method thereof.

In a method for forming a thin film magnetic head having each of thirteenth and fourteenth structures, a magnetic layer of the thin film magnetic head composed of lower and upper magnetic poles is formed by iron or iron nitride as a high saturation magnetic flux density material so that a recording density is improved. Further, after the lower or upper magnetic pole is formed, the lower or upper magnetic pole is annealed before the lower or upper magnetic pole is exposed to an atmosphere including oxygen. Accordingly, it is possible to greatly restrain the lower or upper magnetic pole from being oxidized so that a preferable thin film magnetic head can be formed.

A thin film magnetic head in accordance with each of third to seventh embodiments of the present invention will next be described.

In accordance with a third embodiment of the present invention, a thin film magnetic head has a lower magnetic pole formed on a substrate, a coil constructed by multiple layers, an upper magnetic pole formed on this coil, an adhesive layer for adhering the lower magnetic pole and the coil to each other, and a gap layer formed between the lower and upper magnetic poles. In another embodiment of the present invention, the thin film magnetic head has a filling layer formed between the coil layers and improving flatness of the coil layers. At a recording time of data, the coil is operated by a signal so that this signal is magnetically recorded to a recording medium through the upper and lower magnetic poles and the gap layer. At a reproducing time of the data, the coil is operated to read this signal out of the recording medium through the gap layer, the upper magnetic pole and the lower magnetic pole. At an erasing time of the data, the coil is operated to magnetically erase the above signal from the recording medium through the upper and lower magnetic poles and the gap layer.

In the third embodiment of the present invention, the thin film magnetic head is constructed by adhering the coil and a magnetic layer to each other so that the coil can be manufactured as a unit. Accordingly, the thin film magnetic head has a coil composed of multiple layers and having high performance and can be manufactured without damaging the magnetic layer in a manufacturing process of the magnetic head at a fine processing time of the coil. Therefore, the density of a magnetic record is increased and it is possible to cope with a high frequency operation. In particular, it is possible to use a high Bs magnetic material having higher coercive force such as $\alpha^{11}Fe_{16}N_2$, etc. so that a magnetic head for only writing corresponding to a super high density can be realized.

A method for forming the above thin film magnetic head has a process for forming a lower magnetic pole on a substrate, a process for adhering a coil to the lower magnetic pole, a process for forming a gap layer on the lower magnetic pole, and a process for forming an upper magnetic pole on the coil. In this forming method, the lower magnetic pole is first formed on the substrate and the coil is formed on another substrate.

In particular, a plane substrate is used in a method for forming a multiple layer coil which is important in this thin film magnetic head forming method. In this method, a first coil is formed on a first plane substrate on which a first separating layer is formed. This first coil is formed by using a fine processing technique such as a sputtering method, an evaporation method, a gas phase synthetic method, a thin film forming method such as plating, photolithography, etc.

An insulating layer is added to the first coil. The first coil is adhered to a second plane substrate. After this adhesion, the first plane substrate and the first coil are separated from each other with the first separating layer as a boundary. After the first plane substrate and the firs coil are separated from each other, the first separating layer may be left on sides of the first plane substrate and the first coil. However, the first separating layer may be also removed from the sides of the first plane substrate and the first coil.

For example, when the first separating layer is made of a metal having a low melting point, the first plane substrate and the first coil are separated from each other by heat treatment at a temperature equal to or higher than this melting point. However, a material portion of the first separating layer remains attached onto the sides of the first plane substrate and the first coil. In contrast to this, when the first separating layer is formed by a soluble material and is dissolved by a solution for dissolving the first separating layer, no material portion of the first separating layer is left on the sides of the first plane substrate and the first coil.

The first separating layer may be removed by etching or polishing in accordance with necessity. When a conductive first separating layer remains attached onto the sides of the first plane substrate and the first coil the remaining first separating layer may be coated with an insulating layer.

Thus, a surface of the first coil adjacent to the first plane substrate is exposed. This exposed coil surface has flatness according to a plane degree of the first plane substrate. A second coil is formed on this exposed surface of the first coil. The first and second coils are electrically connected by a conductor to each other through a contact hole, etc. so that these coils are integrated with each other.

Thus, the number of multiple layers of a coil is increased in comparison with a case in which a single substrate is used. This multiple layer coil is adhered to the first plane substrate having a lower magnetic pole thereon through an adhesive layer. The second plane substrate is etched or polished. A second separating layer is formed between the second plane substrate and the integrated coil. The second plane substrate and the integrated coil are separated from each other with this second separating layer as a boundary. In this case, it is preferable to selectively separate both side portions of the second and first separating layers from each other with the second and first separating layers as boundaries by changing materials and characteristics of the second and first separating layers.

It is important to remove a step difference on a surface of the second plane substrate for forming a magnetic layer by adjusting an end face of the second plane substrate by polishing and anisotropic etching so as not to reduce magnetic characteristics of the upper magnetic pole. A filling layer for flatness may be additionally disposed in proximity to the second separating layer or the second plane substrate. A recessed portion fit for the coil may be formed in the first plane substrate for forming a lower magnetic pole thereon. In this case, the lower magnetic pole is formed on this recessed portion of the first plane substrate and a recessed portion of the lower magnetic pole is filled with an adhesive layer. In this case, a surface of the adhesive layer for forming the upper magnetic pole can be approximately set to be flat. A filling layer may be additionally formed in this recessed portion of the lower magnetic pole in accordance with necessity. Further, the adhesive layer surface for forming the upper magnetic pole may be polished to flatten this adhesive layer surface in accordance with necessity.

A gap layer between the upper and lower magnetic poles is formed before or after adhesion of the coil. A protecting layer is then formed on the upper magnetic pole in accordance with necessity. An end face of the magnetic head is polished in a shape suitable for sliding and floating movements with respect to a recording medium.

When the number of multiple layers of the coil is further increased, the thin film magnetic head is formed by a thin film magnetic head forming method using the following coil forming process. Namely, a coil composed of single or multiple layers is formed on a first separating layer on a first plane substrate. A second separating layer is formed on this coil. Further, a constructional member having a second plane substrate is formed on the second separating layer. With respect to this constructional member, a portion of the coil having single or multiple layers is separated from the first or second plane substrate with the first or second separating layer as a boundary. Another coil is further formed on this coil having single or multiple layers so that these coils are integrated with each other.

When the above constructional member is formed, adhesion is required with respect to the separating layers. There are two cases about this adhesion. In a first case, the separating layers have adhesive force. In a second case, the plane substrates and the coils are adhered to each other through additional adhesive layers after the separating layers are formed. In the second case, the adhesive layers are formed between the separating layers and the plane substrates. Otherwise, the adhesive layers are formed between the separating layers and the coils. Each of these adhesive layers also functions as a fitting layer described later. Materials of the first and second separating layers may have separating characteristics from each other to selectively remove the separating layers.

This layer structure is repeatedly formed to construct the coils by multiple layers. In this case, a first separating layer is formed on a first plane substrate and a coil composed of single or plural layers is formed on the first separating layer. A second separating layer is formed on this coil and a second plane substrate is formed on the second separating layer. A portion of the coil having single or multiple layers is separated from the first or second plane substrate with the first or second separating layer as a boundary. Another coil is further formed on this coil having single or multiple layers so that these coils are integrated with each other. A third plane substrate is adhered onto the integrated coils through a third separating layer.

An additional coil can be further formed if both side portions of the first and third separating layers are separated from each other with the first or third separating layer as a boundary. Thus, it is possible to form a coil having an arbitrary layer number. In the above explanation, the first, second and third plane substrates are used to discriminate them from each other. For example, the first and third plane substrates may be set to be equal to each other. Similar arguments also hold true with respect the separating layers. If a filling layer for flatness adjacent to each of the separating layers is used, flatness of each of the separating layers is further improved.

In filling layers are formed between the coils and the separating layers on the plane substrates, a surface of each of the filling layers on sides of the plane substrates has a plane degree according to that of each of the plane substrates. When each of the separating layers is formed by a soluble material and single or plural grooves are formed on a plane of each of the plane substrates, the separating layers can be separated from the plane substrates by the soluble material for a short time even when each of the plane substrates has a large area.

Thus, a magnetic head having high performance can be manufactured without disconnecting the magnetic head by a step difference thereof and deteriorating the upper magnetic pole.

Figure 5:
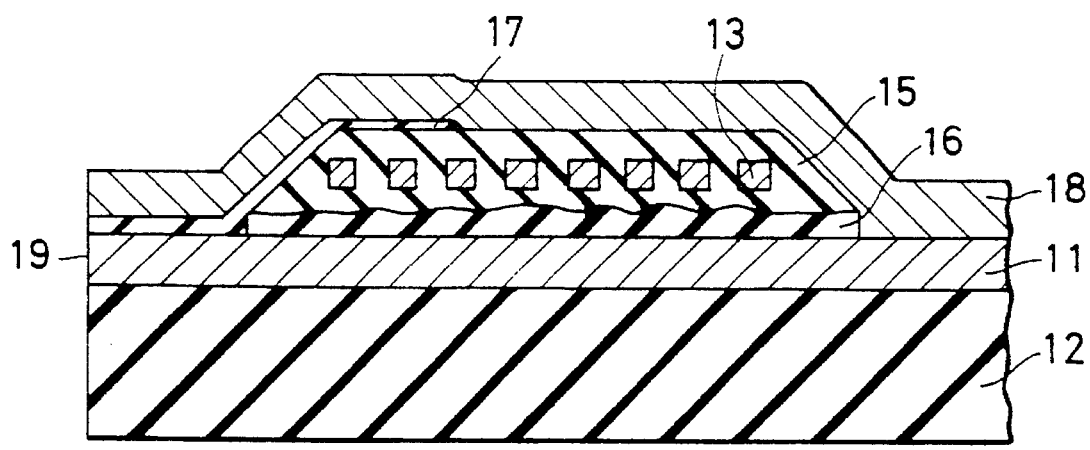
FIG. 5 is a cross-sectional view showing a portion of a thin film magnetic head in accordance with a third embodiment of the present invention.

FIG. 5 shows a thin film magnetic head in accordance with a third embodiment of the present invention.

FIG. 5, a lower magnetic pole 11 is formed on a plane substrate 12. A material of the plane substrate 12 is selectively constructed by alumina, alumina-titanium carbide, glass, sintered forsterite, etc. in accordance with magnetic characteristics of a magnetic layer. In the third embodiment, the plane substrate 12 is made of alumina. A sputtering method, an evaporation method, etc. are used as a method for forming, a thin film on the plane substrate 12. In particular, a plasma method is preferably used as the thin :film forming method as shown in Japanese Patent Publication (KOKOKU) No. 2-16380.

Figure 6:
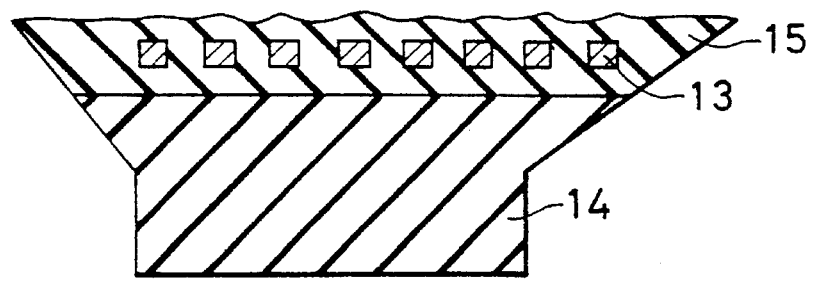
FIG. 6 is a cross-sectional view for explaining a process for forming the thin film magnetic head in the third embodiment.

First, permalloy, Sendust, iron, iron nitride having each of $\alpha$, $\alpha'$ and $\alpha''$ structures, iron-silicon alloy, etc. are selected as a magnetic material. In this third embodiment, iron nitride having the $\alpha$ structure is selected as the magnetic material and a thin film of this iron nitride is formed on the plane substrate 12 as the lower magnetic pole 11. As shown in FIG. 6, a coil 13 adhered onto the plane substrate 12 in a subsequent manufacturing process is first formed on a plane substrate 14 and is covered with an insulating layer 15. This coil 13 can be constructed by multiple layers in a range in which this coil 13 can be formed by a general technique thereof. The insulating layer 15 and the lower magnetic pole 11 are adhered to each other through an adhesive layer 16.

The adhesive layer 16 is constructed by using a normal plane substrate made of silicon monocrystal, glass, etc. It is preferable to remove a difference in step between end portions of the insulating layer 15 and the lower magnetic pole 11 in the adhesion thereof. Therefore, it is desirable to polish an end portion of the plane substrate 14 attaching the coil 13 thereto. When the plane substrate 14 is formed by monocrystal, there is a method in which the end portion of the plane substrate 14 is set to have a cleavage plane and anisotropic etching is performed in this end portion. It is also preferable to polish a central portion of an adhesive face of the plane substrate 14 so that an end portion of the coil 13 comes in close contact with the lower magnetic pole 11 or a gap layer 17.

After the insulating layer 15 and the lower magnetic pole 11 are adhered to each other, all or a portion of the plane substrate 14 is polished. A separating layer may be disposed between the plane substrate 14 and the coil 13 to separate the plane substrate 14 from the coil 13 with this separating layer as a boundary. This separating layer may be formed by a low melting point metal such as indium, tin, zinc, etc., an alloy, resin, soluble organic and inorganic materials such as sodium chloride, sodium silicate, calcium chloride, a photoresist, etc. When the separating layer is formed by using each of a low melting point metal and an alloy, the separating layer is melted by heating so that the plane substrate 14 and the coil 13 are separated from each other. In contrast to this, when the separating layer is soluble, the separating layer is dissolved by a solvent so that the plane substrate 14 and the coil 13 are separated from each other.

Thus, the gap layer 17 is formed after a portion or all of the plane substrate 14 is removed. The gap layer 17 is made of silicon dioxide, alumina, etc. and may be made of iron nitride having a $\zeta$ structure. The gap layer 17 may be formed on the lower magnetic pole 11 before the gap layer 17 is adhered to the coil 13. An upper magnetic pole 18 is then formed on the lower magnetic pole 11 through the coil 13 and the gap layer 17. Thus, layer and coil surfaces for forming the upper magnetic pole 18 can be preferably flattened. An end face 19 of each of the magnetic poles 11 and 18 is polished in a shape fit for a recording medium. An additional electrode and a protecting layer are not illustrated in FIG. 5.

In the third embodiment, the coil 13 can be independently formed so that no lower magnetic pole 11 is damaged at a fine processing time of this coil 13. Further, it is possible to restrain the upper magnetic pole 18 from being deteriorated by irregularities thereof caused when the upper magnetic pole 18 is formed.

Figure 7:
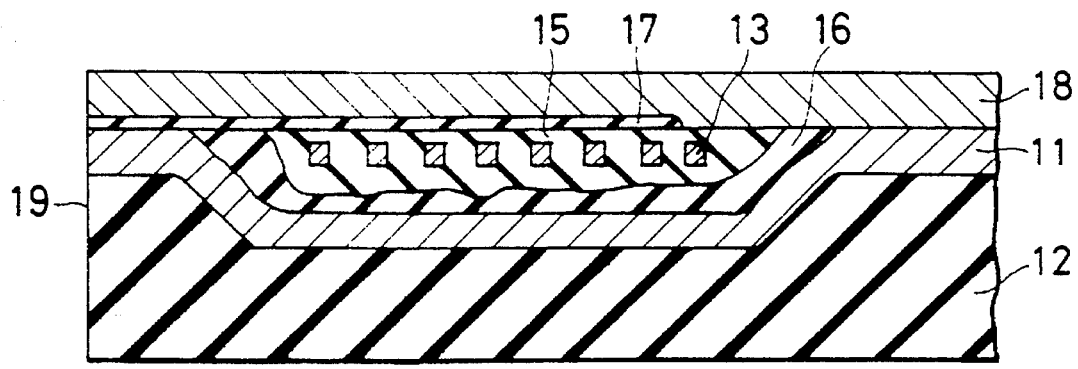
FIG. 7 is a cross-sectional view showing a portion of a thin film magnetic head in accordance with a fourth embodiment of the present invention.

FIG. 7 shows a portion of a thin film magnetic head in accordance with a fourth embodiment of the present invention. In this fourth embodiment, the substrate 12 having the lower magnetic pole 11 thereon in the third embodiment has a recessed portion 20 fit for the shape of a coil 13. After the lower magnetic pole 11 is formed on the substrate 12, the coil 13 having an insulating layer 15 is adhered to a recessed portion of the lower magnetic pole 11 through an adhesive layer 16 so that layer and coil surfaces for forming an upper magnetic pole 18 are flattened.

Figure 8:
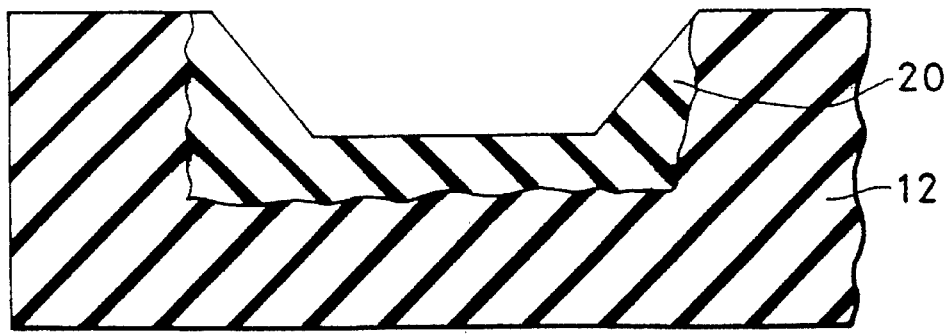
FIG. 8 is a cross-sectional view for explaining a forming example of a recessed portion in the thin film magnetic head of the present invention.

The layer and coil surfaces for forming the upper magnetic pole 18 can be flattened by polishing if these forming surfaces are convex after the adhesion of the coil 13. In contrast to this, if the layer and coil surfaces for forming the upper magnetic pole 18 are concave after the adhesion of the coil 13, this concave portion may be filled with an additional filler material and a layer of this filler material may be then polished to flatten this filler layer. It is important to remove a difference in step of the recessed portion of the substrate 12 so as to restrain the lower magnetic pole 11 from being deteriorated. As shown in FIG. 8, the recessed portion of the substrate 12 may be filled with a filler material 20. In this case, a recessed portion having a step difference providing a gentle inclination is formed on the filler material 20 by pushing a projecting portion having this step difference providing a gentle inclination against this filler material 20.

A method for forming a thin film magnetic head in accordance with a fifth embodiment of the present invention will next be described. In this fifth embodiment, the thin film magnetic head has a highly developed multiple layer coil. FIGS. 9a to 9e respectively show manufacturing processes of this thin film magnetic head in the fifth embodiment.

Figure 9A:
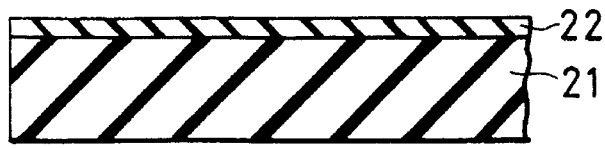
FIGS. 9a to 9e are cross-sectional views showing respective manufacturing processes of a method for forming a thin film magnetic head in accordance with a fifth embodiment of the present invention.

In the fifth embodiment, there is a manufacturing process for forming a separating layer 22 on a plane substrate 21 as shown in FIG. 9a. For brevity, the plane substrate 21 is constructed by a glass substrate flattened by polishing and the separating layer 22 is made of indium. As described later, when a constructional member having plural separating layers is used, this constructional member may be combined with a soluble separating layer to improve selective removing characteristics of the plural separating layers. When no indium is used for the separating layer 22, the constructional member may be combined with a water soluble separating layer which is refractory with respect to an organic solvent. The constructional member may be also combined with a separating layer which is refractory with respect to aqueous solution and is soluble in an organic solvent. The constructional member may be also combined with a separating layer which is soluble in acid and is refractory with respect to alkali. Otherwise, when no indium is used for the separating layer 22, the constructional member may be combined with a separating layer which is soluble in alkali and acid.

An indium film is formed on the plane substrate 21 as the separating layer 22 by a vacuum evaporation method and a sputtering method. The separating layer 22 can be formed as a thin film in a plasma atmosphere and an indium portion can be slightly oxidized by introducing oxygen thereinto to control adhesion of the separating layer 22. A thickness of the indium film is set in accordance with an area and a plane degree of the plane substrate 21 and is approximately set to 0.1 to several ten μm.

Figure 9B:
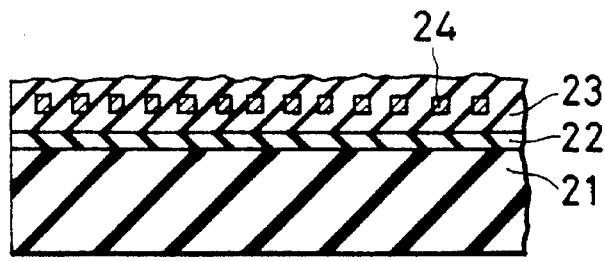

In the fifth embodiment, as shown in FIG. 9b, there is a process for forming a coil 24 having an insulating layer 23 on the separating layer 22. This coil forming process has a well-known process used to form a coil in the general thin film magnetic head. For example, the coil forming process is composed of a process for forming a portion of the insulating layer 23 on the separating layer 22. The coil forming process is also composed of a process for forming a spiral coil 24 on this insulating layer 23 by photolithography. The coil forming process is further composed of a process for forming the remaining portion of the insulating layer 23 on the spiral coil 24. In the general coil forming process, it is possible to form a coil composed of two or three layers. In the fifth embodiment, the coil 24 is formed as multiple layers in a range in which the coil 24 can be formed by the coil forming process.

Figure 9C:
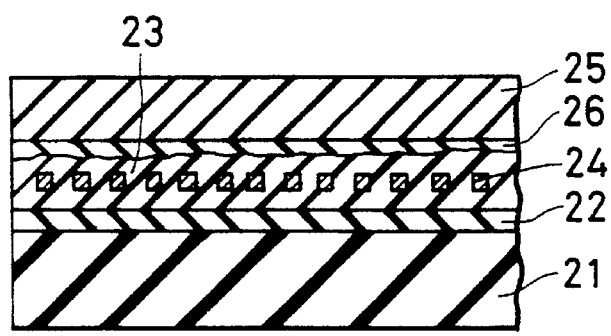

In the fifth embodiment, as shown in FIG. 9c, there is a process for adhering a second plane substrate 25 and the coil 24 to each other through an adhesive layer 26 using an adhesive. The adhesive is constructed by using glass, resin, a metal, etc. Thus, the separating layer 22, the coil 24 and the second plane substrate 25 are formed on the first plane substrate 21.

Figure 9D:
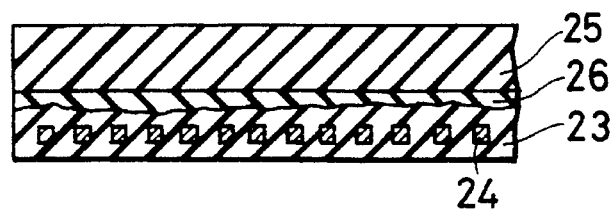

In the fifth embodiment, as shown in FIG. 9d, there is a process for separating the constructional member obtained by the manufacturing process shown in FIG. 9c from the first plane substrate 21 with the separating layer 22 as a boundary. In this process, the separating layer 22 made of indium is dissolved by heat treatment so that the above constructional member is separated from the first plane substrate 21 with the separating layer 22 as a boundary. In this fifth embodiment, indium constituting the separating layer 22 is conductive so that a process for removing indium left on the coil 24 therefrom by acid treatment, polishing, etc. is added.

When no indium left on the coil 24 is removed therefrom, a process for coating this indium with an insulating layer is added. For example, an additional separating layer made of NaCl, etc. may be coated in advance between the coil 24 and the separating layer 22. In this case, the additional separating layer is dissolved by water and the remaining indium is removed (or lifted off). An exposure surface obtained by the removal of indium has an excellent plane degree according to flatness of the plane substrate 21.

Figure 9E:
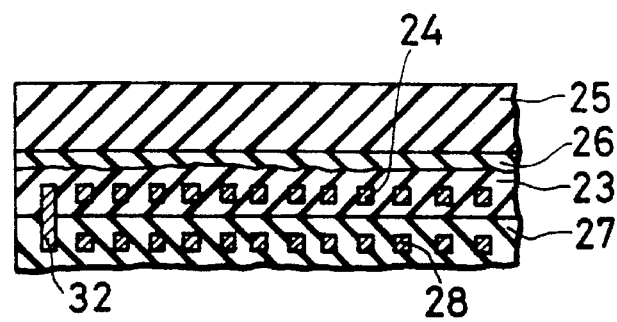

As shown in FIG. 9e, another coil 28 having an insulating layer 27 is then formed on this exposure surface by using a general fine processing technique. A contact hole is formed in each of the insulating layers 23 and 27 respectively disposed on the coils 24 and 28. The coils 24 and 28 are electrically connected to each other through a conductor 32 so that these coils are integrated with each other.

Thus, it is possible to form a coil having a large multiple layer number in comparison with the general technique. As mentioned in the above embodiments, a lower magnetic pole is formed on the plane substrate 21 and the above coil is adhered onto this lower magnetic pole through an adhesive layer. Further, as mentioned in the above embodiments, after the plane substrate 25 is removed from the coil 24, a gap layer is formed on the coil 24 and an upper magnetic pole is formed on this gap layer.

Figure 10:
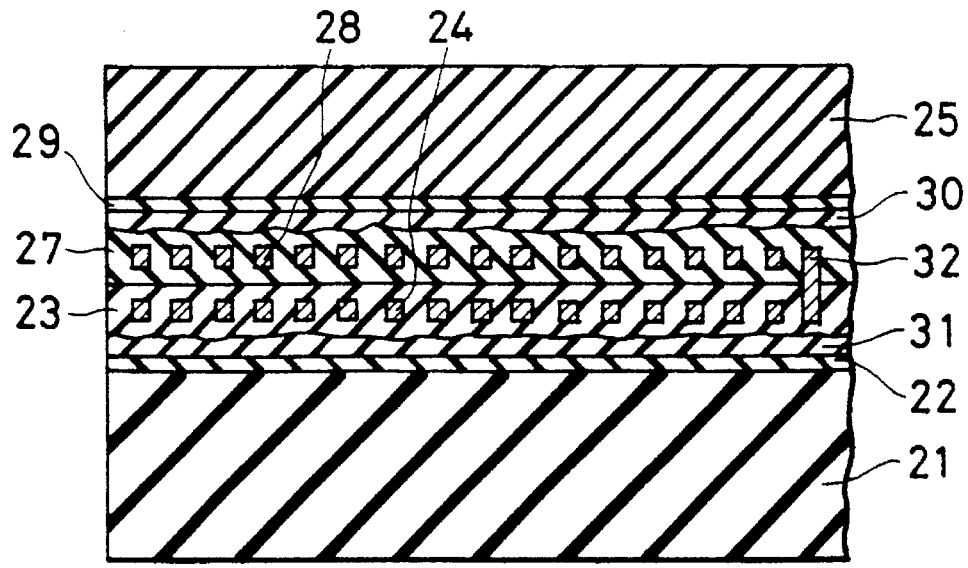
FIG. 10 is a cross-sectional view for explaining a method for forming a thin film magnetic head in accordance with a sixth embodiment of the present invention.

In a sixth embodiment of the present invention shown in FIG. 10, the number of multiple layers of coils is further increased in a manufacturing process relative to the coil forming method in the fifth embodiment. Namely, in the above constructional member obtained in FIG. 9e, a separating layer 29 is formed between the plane substrate 25 and the coil 24. The plane substrate 25 or 21 is separated from a constructional portion having the coil 24 with the separating layer 29 or 22 as a boundary. Thereafter, a third coil is further formed on an exposure surface of this coil 24 so that the coils are integrated with each other.

In this case, a filling layer 30 is formed between the separating layer 29 and the coil 28 to improve flatness of layer and coil surfaces for forming an upper magnetic pole. Further, a filling layer 31 may be formed between the separating layer 22 and the coil 24 to improve the flatness of layer and coil surfaces for forming the upper magnetic pole. When one or both of the filling layers 30 and 31 are formed, flatness of the integrated multiple layer coil can be set to be very preferable. For example, materials of the filling layers 30 and 31 are constructed by glass, resin such as an adhesive, a low melting point metal, etc. A contact hole is formed in an insulating layer of the third coil, the insulating layer 23 of the coil 24 or the insulating layer 27 of the coil 28. The third coil and the coil 24 is electrically connected to each other through a conductor. Otherwise, the third coil and the coil 28 is electrically connected to each other through a conductor.

For example, the filling layers 30 and 31 are respectively formed on the separating layers 25 and 22 in a process for forming the coils 28 and 24 by using these filling layers 30 and 31 after the separating layers 25 and 22 made of NaCl are respectively formed on the plane substrates 25 and 21. In this case, each of surfaces of the filling layers 30 and 31 on sides of the plane substrates 25 and 21 has flatness according to a plane degree of each of the plane substrates 25 and 21.

Figure 11:
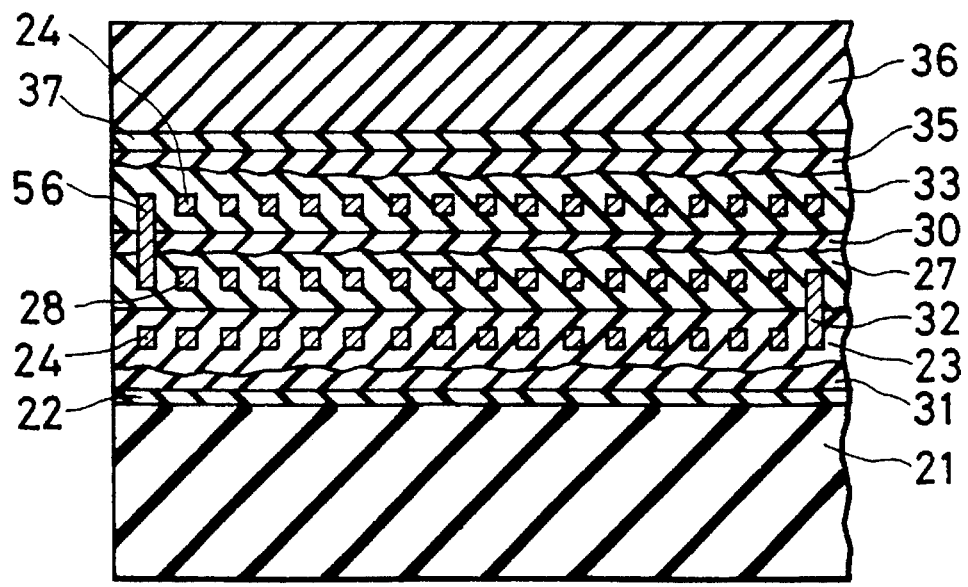
FIG. 11 is a cross-sectional view for explaining the forming method of the thin film magnetic head in the sixth embodiment.

In this sixth embodiment, a manufacturing process shown in FIG. 11 may be added. In this manufacturing process, a third coil 34 having an insulating layer 33 is electrically connected to the coil 28 through a conductor 56 and is adhered onto a plane substrate 36 through a filling layer 35 and a separating layer 37. If this manufacturing process is added, it is possible to form a coil having an arbitrary layer number by repeatedly using the above process for adding coils to each other.

Figure 12:
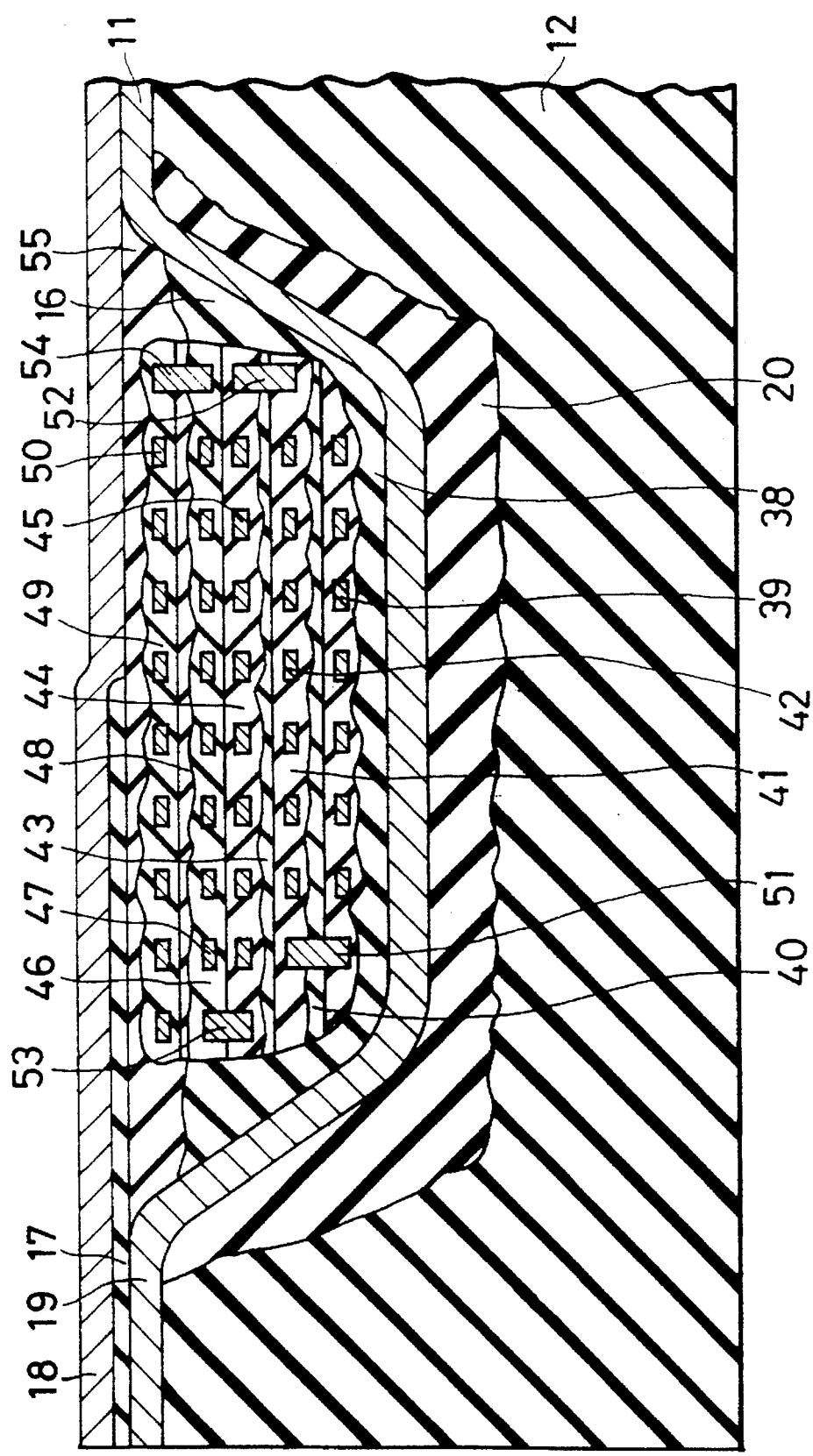
FIG. 12 is a cross-sectional view showing a portion of a thin film magnetic head in accordance with a seventh embodiment of the present invention.

FIG. 12 shows a thin film magnetic head in accordance with a seventh embodiment of the present invention using such a thin film magnetic head forming method in which many coil layers are laminated with each other by using wiring.

In FIG. 12, a recessed portion of a plane substrate 12 is filled with a filler material 20. A lower magnetic pole 11 is formed on this filler material 20. A coil 39 having an insulating layer 38 is adhered to a recessed portion of this lower magnetic pole 11 through an adhesive layer 16.

A filling layer 40, a coil 42 having an insulating layer 41, a filling layer 43 and a coil 45 having an insulating layer 44 are formed on this coil 39. Further, a coil 47 having an insulating layer 46, a filling layer 48 and a coil 50 having an insulating layer 49 are formed on the coil 39. The coils 39, 42, 45, 47 and 50 are respectively electrically connected to each other through conductors 51 to 54 so that an integrated coil composed of five layers is formed. A filling layer 55 and a gap layer 17 are formed on the coil 50 and an upper magnetic pole 18 is formed on this gap layer 17.

Surfaces of the filling layer 55 for forming the gap layer 17 and the upper magnetic pole 18 are flattened by polishing. The recessed portion of the filler material 20 is formed in a concave shape having a step difference having a gentle inclination by a projecting member having a convex shape. Accordingly, this thin film magnetic head having multiple layers electrically connected to each other by wiring can be more finely constructed in comparison with the general thin film magnetic head. Further, the density of a magnetic record can be increased and it is possible to cope with a high frequency.

The respective layer coils are normally connected in series to each other, but may be connected in parallel to each other when it is especially necessary to reduce resistance of these coils. The multiple layer coils may be separated into upper and lower layer coils composed of coils for writing data and coils for reading data. The present invention is not limited to the above embodiments. For example, when a soluble separating layer is used, it is difficult to dissolve the separating layer on a plane substrate having a large area. In this case, if single or plural grooves are formed in the plane substrate, the separating layer can be removed from the plane substrate for a short time even when the plane substrate has a large area.

As mentioned above, in first and third structures of the present invention, a thin film magnetic head has a lower magnetic pole formed on a substrate, a coil, an upper magnetic pole formed on this coil, an adhesive layer for adhering the lower magnetic pole and the coil to each other, and a gap layer formed between the lower and upper magnetic poles. Accordingly, the density of a magnetic record can be increased and it is possible to cope with a high frequency operation.

In sixteenth to twenty-third structures of the present invention, a method for forming a thin film magnetic head has the steps of a process for forming a lower magnetic pole on a first plane substrate, a process for adhering the lower magnetic pole and the coil to each other, a process for forming an upper magnetic pole on the coil, and a process for forming a gap layer between the lower and upper magnetic poles. Accordingly, in this thin film magnetic head, the density of a magnetic record is increased and it is possible to cope with a high frequency operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for forming a thin film magnetic head, comprising the steps of:

forming a lower magnetic pole on a first substrate;

forming a recessed portion on a face of a second substrate;

forming a coil within the recessed portion on the second substrate;

polishing a face of the lower magnetic pole on the first substrate and/or the face of the second substrate adhering the first and second substrates to each other such that the face of the lower magnetic pole and the face of the coil on the second substrate come in close contact with each other;

polishing or etching another face of the second substrate;

forming a gap layer on said another face; and forming an upper magnetic pole on said gap layer.

2. A method for forming a thin film magnetic head as claimed in claim 1, wherein the second substrate comprises a crystalline substrate and the recessed portion of the second substrate is formed by anisotropic etching.

3. A method for forming a thin film magnetic head as claimed in claim 1 or 2, wherein the method comprises the further step of forming a buffer layer for adhesion on the lower magnetic pole on the first substrate and/or the coil on the second substrate.

4. A method for forming a thin film magnetic head as claimed in claim 1 or 2, wherein the second substrate comprises a crystalline substrate and the method comprises the further step of forming a difference in step on the another face of the second substrate, said difference in step defining an obtuse angle with respect to said face of said second substrate so as to permit forming the upper magnetic pole by anisotropic etching.

5. A method for forming a thin film magnetic head, comprising the steps of:

forming a lower magnetic pole on a first substrate;

forming a recessed portion on a face of a second substrate;

forming a coil within the recessed portion on the second substrate;

polishing a face of the lower magnetic pole on the first substrate and/or the face of the second substrate;

adhering the first and second substrates to each other such that the face of the lower magnetic pole and a face of the coil on the second substrate come in close contact with each other;

polishing or etching another face of the second substrate;

forming a coil on the polished or etched another face of the second substrate;

forming a gap layer over the coil on said another face; and forming an upper magnetic pole on said gap layer.

6. A method for forming a thin film magnetic head, comprising the steps of:

forming a lower magnetic pole on a first substrate having a recessed portion;

forming a coil on a face of a second substrate;

adhering the first and second substrates to each other such that the coil is adjacent to the lower magnetic pole in the recessed portion;

polishing or etching another face of the second substrate;

forming a gap layer on said another face; and forming an upper magnetic pole on said gap layer.

7. A method for forming a thin film magnetic head as claimed in claim 6, wherein the forming method further comprises the step of polishing a face of the lower magnetic pole and/or the face of the second substrate such that the face of the lower magnetic pole and a face of the coil on the second substrate come in close contact with each other by said adhering step.

8. A method for forming a thin film magnetic head as claimed in claim 6 or 7, wherein the lower magnetic pole is made of iron or iron nitride and is annealed before the lower magnetic pole is exposed to an atmosphere including oxygen after the lower magnetic pole is formed.

9. A method for forming a thin film magnetic head as claimed in claim 6 or 7, wherein the upper magnetic pole is made of iron or iron nitride and is annealed before the upper magnetic pole is exposed to an atmosphere including oxygen after the upper magnetic pole is formed.

10. A method for forming a thin film magnetic head, comprising the steps of:

forming a lower magnetic pole on a first substrate having a recessed portion;

forming a coil on a face of a second substrate;

adhering the first and second substrates to each other such that the coil is adjacent to the lower magnetic pole in the recessed portion;

polishing or etching another face of the second substrate;

forming another coil on the polished or etched another face of the second substrate;

forming a gap layer over the coil on said another face; and forming an upper magnetic pole on said gap layer.

11. A method for forming a thin film magnetic head, comprising the steps of:

forming a separating layer on a first substrate;

forming a first coil on the separating layer;

adhering a second substrate on the first coil;

separating the first substrate and the first coil from each other with the separating layer as a boundary;

integrally forming a second coil on the first coil;

forming a lower magnetic pole on the first substrate or on another substrate for a lower magnetic pole;

adhering the first substrate or the another substrate for a lower magnetic pole and second substrate to each other such that the second coil is adjacent to the lower magnetic pole;

removing a portion or all of the second substrate;

forming a gap layer; and forming an upper magnetic pole on the first coil and the gap layer.

12. A method for forming a thin film magnetic head as claimed in claim 11, wherein said first substrate has a recessed portion and said method further comprises the step of forming a filling layer on the lower magnetic pole within the recessed portion, and said second coil is adhered onto the filling layer.

13. A method for forming a thin film magnetic head, comprising the steps of:

forming a separating layer on a first substrate;

forming a layer coil on the separating layer, said layer coil having single or plural layers;

adhering a second substrate on the layer coil;

separating the first substrate and the layer coil from each other with said separating layer as a boundary;

integrally forming an another coil on an exposure surface of said layer coil;

forming a lower magnetic pole on the first substrate or on another substrate for a lower magnetic pole;

adhering the first substrate or the another substrate for a lower magnetic pole and second substrate to each other such that the another coil is adjacent to the lower magnetic pole;

removing a portion or all of the second substrate;

forming a gap layer; and forming an upper magnetic pole on the layer coil and the gap layer.

14. A method for forming a thin film magnetic head as claimed in claim 13, wherein said first substrate has a recessed portion and said method further comprises the step of forming a filling layer on the lower magnetic pole within the recessed portion, and said another coil is adhered onto the filling layer.

15. A method for forming a thin film magnetic head as claimed in claim 13, wherein said forming method further comprises the step of forming a filling layer between said separating layer and said layer coil.

16. A method for forming a thin film magnetic head as claimed in claim 13, wherein said forming method further comprises the step of adhering a third substrate onto said integrally formed another coil through another separating layer.

17. A method for forming a thin film magnetic head as claimed in claim 16, wherein said forming method further comprises the step of forming a filling layer between said another separating layer and said another coil to improve flatness thereof.

18. A method for forming a thin film magnetic head as claimed in claim 11, wherein the method further comprises the step of forming one or plural grooves on a plane of each of said first and second substrates.

* * * * *